(12) United States Patent
Cato et al.

(10) Patent No.: US 7,656,628 B2
(45) Date of Patent: Feb. 2, 2010

(54) APPARATUS FOR PROVIDING FAULT PROTECTION IN A CIRCUIT SUPPLYING POWER TO AN ELECTRONIC DEVICE

(75) Inventors: Robert Thomas Cato, Raleigh, NC (US); Timothy Wayne Crockett, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 699 days.

(21) Appl. No.: 11/462,597

(22) Filed: Aug. 4, 2006

(65) Prior Publication Data
US 2008/0030166 A1    Feb. 7, 2008

(51) Int. Cl.
H02J 7/00    (2006.01)
(52) U.S. Cl. ........................................................ 361/59
(58) Field of Classification Search .................... 361/59; 320/116; 455/557
See application file for complete search history.

(56) References Cited

U.S. PATENT DOCUMENTS

| | | | | |
|---|---|---|---|---|
| 5,045,769 | A * | 9/1991 | Everett, Jr. | 320/107 |
| 6,879,133 | B1 | 4/2005 | Geren | |
| 6,903,533 | B1 * | 6/2005 | Geren et al. | 320/134 |
| 7,076,270 | B2 * | 7/2006 | Jaggers et al. | 455/556.1 |
| 2001/0015635 | A1 * | 8/2001 | Leppo et al. | 320/116 |
| 2002/0002690 | A1 | 1/2002 | Lai et al. | |
| 2004/0156154 | A1 | 8/2004 | Lazarovich et al. | |
| 2008/0039160 | A1 * | 2/2008 | Homer et al. | 455/575.7 |
| 2008/0195905 | A1 * | 8/2008 | Grise et al. | 714/731 |
| 2009/0102507 | A1 * | 4/2009 | Grise et al. | 326/16 |
| 2009/0153098 | A1 * | 6/2009 | Toya et al. | 320/108 |

FOREIGN PATENT DOCUMENTS

WO    WO2005033819 A2    4/2005

* cited by examiner

*Primary Examiner*—Stephen W Jackson
*Assistant Examiner*—Angela Brooks
(74) *Attorney, Agent, or Firm*—Yee & Associates, P.C.; Mark E. McBurney

(57) ABSTRACT

Apparatus is provided to limit the current drawn from a power supply output connected to furnish power to a docking station or electronic device, when a fault connects the output to ground or other docking connection. The power supply is disconnected when such fault is present during power-up. In one embodiment, the apparatus controllably limits current delivered to a docking station and a mobile device connected thereto. The apparatus includes a switch device located along a current path extending between the power supply and docking station, to regulate current flow. A current limiting entity operates the switch device to prevent current flow, when the fault affects the circuit, and current through the path exceeds a pre-specified threshold level. The pre-specified current threshold level can be less than the current level provided to the docking station and mobile device without said fault. A disabling component de-activates the current limiting entity, when current is flowing to the charging station but the current is unaffected by the fault.

20 Claims, 3 Drawing Sheets

APPARATUS FOR PROVIDING FAULT PROTECTION IN A CIRCUIT SUPPLYING POWER TO AN ELECTRONIC DEVICE

BACKGROUND OF THE INVENTION

1. Field of the Invention

The invention disclosed and claimed herein generally pertains to an apparatus for providing fault protection, in a power supply or in a circuit that connects an electronic device to a power supply. More particularly, the invention pertains to apparatus of the above type wherein faults can occur that cause excessive levels of current to flow to the connection of the electronic device from the power supply. Even more particularly, the invention pertains to apparatus of the above type wherein one or more mobile or other electronic devices are removably insertable into a docking station, or otherwise connected to a power supply, in order to receive power.

2. Description of the Related Art

The use of electronic devices for computing and communications is becoming increasingly diverse, as the mobility of such devices increases and their costs diminish. As an example, mobile computing devices are currently being made available to customers at certain large discount stores. The mobile computing devices reside in a rack near a store entrance, and can easily be mounted on shopping carts by customers, to assist them in their shopping. When a device is returned to the rack, it is inserted into a charging or docking station, to allow the device battery to be recharged from a power supply.

It is very common for a mobile device to be connected to a docking station, with the power turned on to both the docking station and the device. Because of this, power supplies used to provide current for recharging mobile devices are typically provided with over-current sensor and shutdown circuits. Thus, if excessive current is drawn from the power supply, so that a threshold is exceeded, the circuit will operate to shut the power supply down. The threshold for the amount of current drawn that will cause shutdown is usually selected to be significantly more than the amount of current required for normal operation of the docking station. This is done so that shutdown will not occur falsely or erroneously. The threshold can in fact be so high that the connector pins, or other elements used to connect the mobile device to the docking station, can become pitted or otherwise damaged by faults that cause excessive current. Moreover, typical shutdown circuits pulse the power supply back on, in order to sense if the fault is still present, and if so, act to shut the power supply back down. This causes the power supply to pulse on and off, possibly for a long period of time, until the fault has been corrected.

Unfortunately, in highly public places such as stores of the above type, it is common for debris comprising conductive material, such as coins, tin foil or the like, to become scattered around the recharging rack that contains the mobile devices while not in use. It has been found that if debris of this sort comes into contact with a structure connecting a device to the charging station, the connecting structure may be short circuited to ground. Such a short circuit fault can cause an excessive amount of current to be drawn from the power supply. Moreover, a fault of this type tends to remain until corrected manually. Thus, if a short circuit fault occurs, a power supply provided with a current shutdown circuit as described above could continue to pulse on and off for a very long period of time, which is not desirable A further problem in circuits used with charging or docking stations relates to inrush current. When a mobile device is connected to a charging station and the battery charge of the device is low, a substantial inrush current will initially flow into the charging station and the device, from the power supply. The inrush current can cause the connectors to pit, and can also drag down the voltage on the host machine to the point where the power supply of the host machine goes out of regulation. Accordingly, it is common to provide an inrush control circuit that includes power transistors. However, the combination of an inrush control circuit, together with an over-current protection circuit of the type described above, can create further problems. For example, if the over-current shutoff threshold is high enough to avoid false shutdowns, the resulting current may be high enough to damage the power transistors of the inrush control circuit. This is especially likely to happen with power supplies that pulse on and off for long periods of time, when too much current is being drawn. Under this condition the inrush current control circuit acts repeatedly, to try and limit the large current, and will overheat unless large transistors with heat sinks are used.

It would be desirable to provide an improved mechanism for protecting against excessive current in circuits that connect a power supply to a docking station. Such mechanism would be particularly useful in regard to excess currents that are caused by short circuit faults of the type described above.

BRIEF SUMMARY OF THE INVENTION

Embodiments of the invention generally limit the current that can be drawn from a power supply output, when the output is connected to supply power, for example, to a docking station, and a fault inadvertently connects the power supply output to ground. The power supply is shut off when a fault of this type is present during power-up, at a threshold current value that is less than the current required for normal device charging operations of the docking station. Such shutoff is usefully achieved by means of a current limiting mechanism or entity that is responsive to power supply output voltage. This entity functions to disconnect the docking station from the power supply, until the shorting fault is removed. Thus, the voltage on the docking connector is not allowed to pulse on and off. In another embodiment, apparatus controllably limits the current delivered to a charging station from a power supply output, wherein a mobile electronic device is detachably connectible to the charging station. A first switch device is located along a current path extending from the power supply to the charging station, to regulate current flow through the path. When a fault causes the current flowing through the path to exceed a pre-specified value while the power supply voltage is below a pre-specified value, a voltage sensitive current limiting entity operates the first switch device to prevent current flow through the path. The current limiting entity is disabled when the power supply voltage exceeds the pre-specified voltage.

The invention is not, of course limited to use with docking stations, but generally can be used in any application where an external power source or power brick is connected to an electronic device, to provide power thereto.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
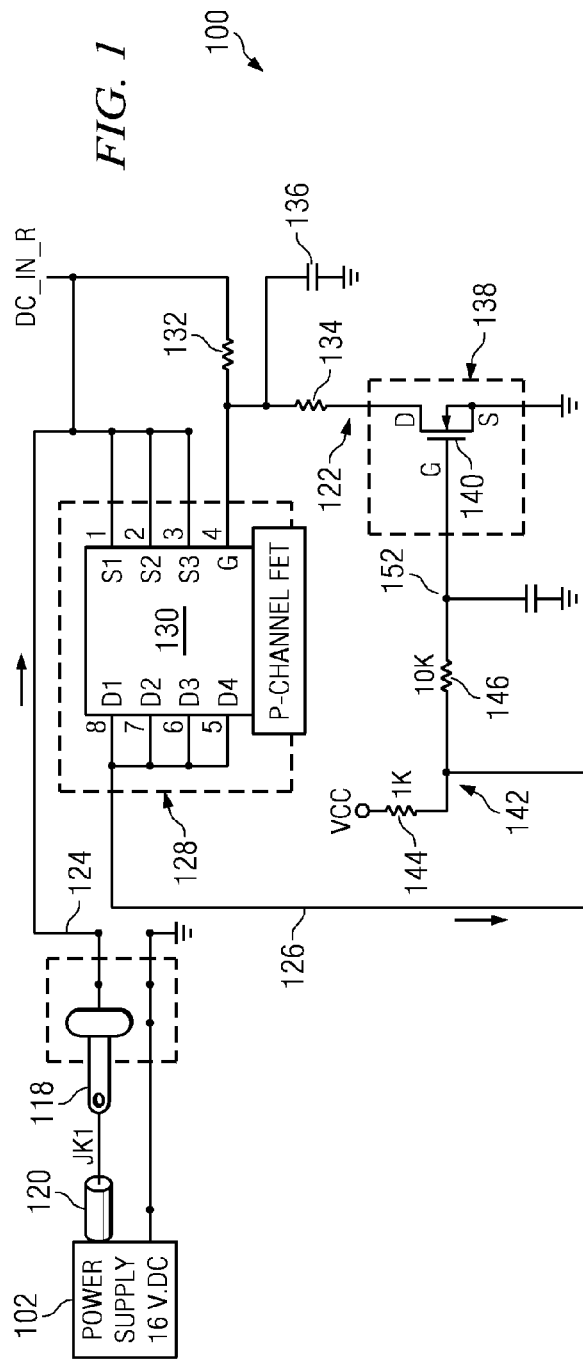
FIG. 1 is a circuit diagram showing an embodiment of the invention, wherein a fault is present.
Figure 1:
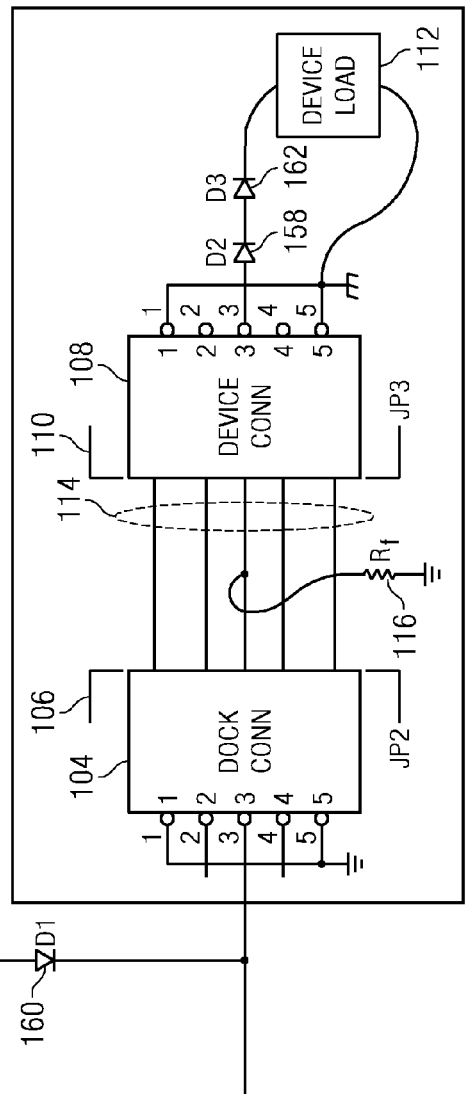

Referring to FIG. 1, there is shown a current limiting circuit 100 for implementing an embodiment of the invention, wherein some of the components of circuit 100 have been simplified. Circuit 100 provides a path for routing DC current from a power supply 102 to a docking connector 104, which is a component of a charging or docking station 106 (shown only in part). Docking connector 104 is configured to mate with a complementary connector 108 of a mobile electronic device 110 (shown only in part), such as a wireless telephone or computing device, in order to provide power to the device. Thus, DC power from power supply 102 is able to flow through circuit 100 to charge or recharge a battery of device 110 and also power the electronics in device 110, the battery and electronics being represented in FIG. 1 as device load 112. Usefully, power supply 102 has a voltage of 16 volts DC, but the invention is not limited thereto. Power supply 102 may comprise a power supply device of a type commonly referred to in the art as a power brick.

Connectors 104 and 108 usefully comprise JP2 and JP3 connectors, respectively. FIG. 1 further shows connector elements 114, which collectively represent pins or fingers on connector 104 that mate with complementary receptors (not shown) on connector 108. Thus, mobile device 110 is connected through elements 114 to docking or charging station 106, to receive power and signals therefrom. However, device 110 must be easily connectable to and disconnectable from station 106. Accordingly, in many applications the connector elements 114 will not be sealed from the surrounding environment. As a result, debris that is formed of highly conductive material may inadvertently come into contact with elements 114, and short circuit them to ground or short elements 114 together. A fault of this type can cause an excessive current to flow through the connector elements 114, so that they become pitted. Arcing may also occur, which can remove gold plating or other conductive material from the elements 114. In FIG. 1, a shorting fault of this type is depicted as resistance 116, also referenced as $R_f$, which is connected between one of the connector elements 114 and ground. More specifically, $R_f$ represents the effect of the element 114 connected between terminal 3 of each connector, so that such element carries current from the power supply, wherein such element becomies connected to an element 114 that is connected to ground. It will be appreciated that if the conductivity of the debris causing the fault is high, the resistance of $R_f$ will be very low.

Referring further to FIG. 1, there is shown a connector 118, such as a JK1 connector, disposed for connection to an output terminal 120 of power supply 102. Connector 118 may serve as a jack for power supply 102, and is connected to a current lead or trace 124 of circuit 100. Thus, connector 118 acts to couple power from power supply output 120 to circuit 100. An over current sensor and pulsing shut down mechanism of the type described above (not shown) may be included in power supply 102. FIG. 1 shows current flowing through lead 124 to a lead or trace 126, through a large power transistor switch 128, and through lead 126 to an input terminal of docking connector 104.

Switch 128 usefully comprises a comparatively large power FET 130, such as a P channel FET FDS4435. An FET of this type has three source connections S1-S3, which receive an input through lead 124, and four drain connections D1-D4. To control the operation of FET Switch 130, a biasing circuit 122, comprising a bias voltage DC_IN_R, resistors 132 and 134, and a capacitor 136, is connected to gate G of FET 130. Bias voltage DC_IN_R can be the voltage supplied by power supply 102 or a voltage derived from it. Biasing circuit 122 also includes a transistor control switch 138, connected between gate G of FET 130 and ground. Thus, switch 138 controls the gate of power FET 130, to operate FET 130 as a switch. When switch 138 is closed, the FET switch 130 is turned on by biasing circuit 122. This allows current to flow from power supply 102 through FET 130 to docking connector 104, in order to charge and power the device 110. On the other hand, opening switch 138 turns off FET 130, to effectively prevent current provided by power supply 102 from reaching docking connector 104.

Control switch 138 usefully comprises an FET 140 that is substantially smaller than FET 130. The drain D and source S of FET 140 are connected to components of biasing circuit 122, and to ground, respectively. A biasing circuit 142 is connected to gate G of FET 140, to control the operation thereof. Biasing circuit 142 comprises a bias voltage VCC, resistors 144 and 146, and a capacitor 148. Bias voltage VCC is a DC voltage derived (derivation not shown) from output of power supply 102, typically 3.3 to 5.0 volts, but the circuit can be designed to use other voltages. In addition, biasing circuit 142 includes a switching node 152 to which a voltage is applied to turn on control FET 140, so that FET 140 turns on FET switch 130. In the absence of the voltage node 152 disables biasing circuit 142, so that FET 140 becomes open. Thereupon, FET 140 acts to turn off FET switch 130.

In order to respond to the shorting fault represented by resistance $R_f$, and to the excessive current resulting therefrom, FIG. 1 shows a diode 160 connected between biasing circuit 142 and current lead 126. Diode 160 is also referenced as D1. For a very low value of fault load $R_f$, the short circuit caused thereby will result in very high current being drawn to docking connector 104 from the output of power supply 102. At the same time, the output voltage which is supplied through lead 126 to terminal 3 of connector 104 will drop significantly. This occurs because power supply 102 has insufficient capability to maintain the voltage level. When the voltage reaches a low enough level, diode 160 becomes forward biased. This condition of diode 160 effectively pulls down the gate G of FET 140, so that control FET 140 is turned off. This, in turn, allows pullup resistor 132 to pull up the gate G of FET switch 130, so that FET 130 is likewise turned off. Current flow from power supply 102 to connector 104 is thereby prevented.

It is to be appreciated that FET switch 130 will be shut off and remain so, whenever diode 160 is forward biased. Accordingly, even if the pulse shut down mechanism in power supply 102 pulses on, as described above, FET switch 130 will still block the flow of current, and thus protect the connectors 104 and 108.

The threshold value of current flowing from the power supply output, at which FET switch 130 is turned off, is controlled by the value of resistor 144 and by the forward voltage drop across diode 160. This current threshold value can be made to be significantly less than the current level required by normal operation of circuit 100, when the circuit is being used to charge device 110. Diodes 158 and 162 in device 110 enable this to be done, as is explained below.

Figure 2:
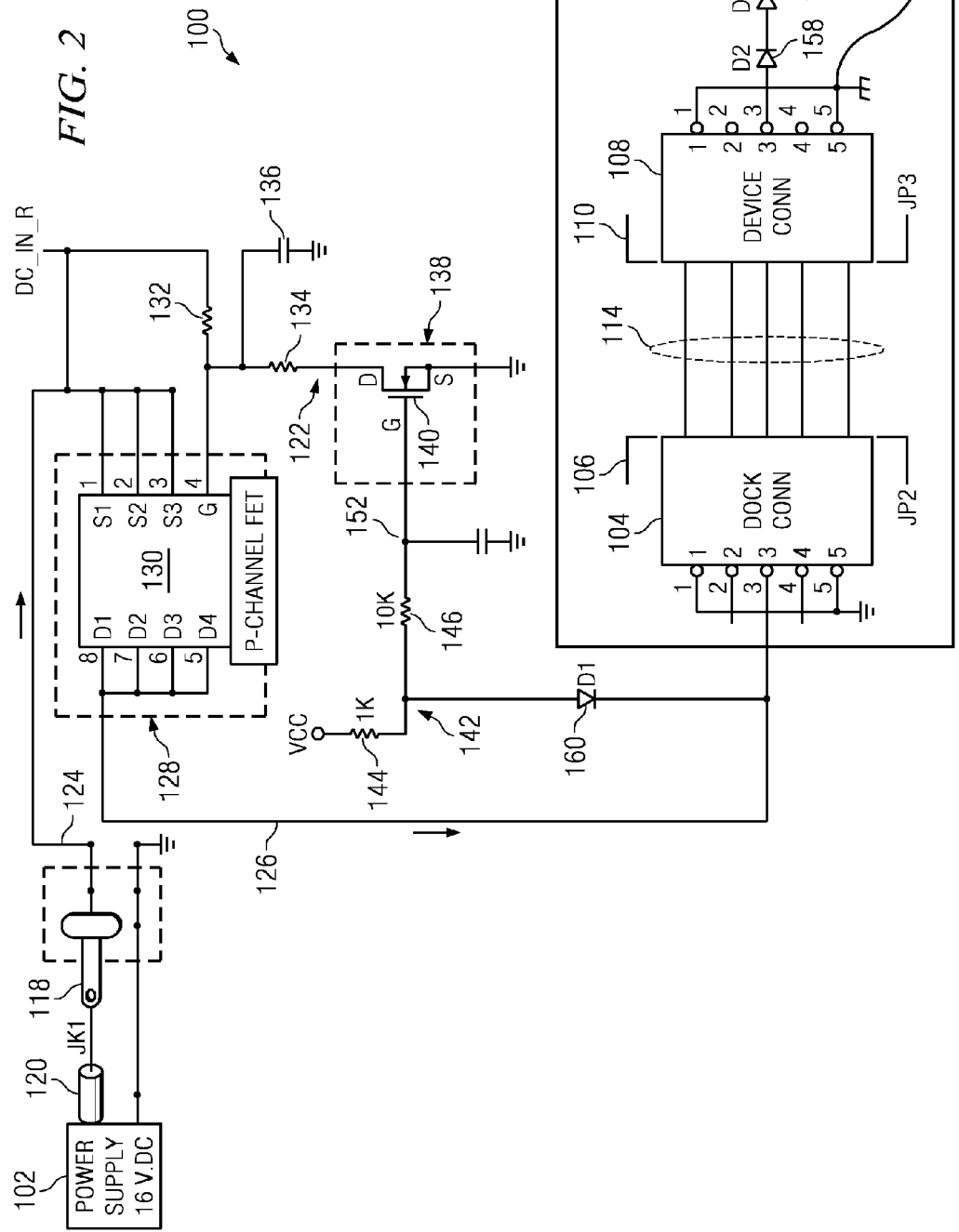
FIG. 2 is a circuit showing the embodiment of FIG. 1, wherein the fault shown in FIG. 1 is not present.

Referring to FIG. 2, there is shown the embodiment of FIG. 1 wherein the fault load $R_f$, or resistance 116, has been removed or is otherwise not present.

Given the configuration of circuit 100 as described above, it is necessary to include diodes 158 and 162 in device 110, so that the diodes are in series with the device load 112. These two diodes are needed, because it could happen that device load 112 is so small that there is only a negligible voltage drop across it. In this circumstance, without further voltage drop diode 160 would be in a forward biased mode. As discussed above, forward biasing of the diode 160 has the effect of turning off control FET 140, and thus turning off the power FET 130. Accordingly, no current would flow to docking connector 104 or device 110.

The voltage drop across each diode 158 and 162, required for the diodes to become forward biased and start conducting current, is typically about 0.7 volts. Thus, the series connection of diodes 158 and 162, also referenced as diodes D2 and D3, respectively, is on the order of 1.4 volts before current can flow through the series connection thereof. This voltage is sufficient to reverse bias diode 160, so that such diode cannot conduct current. It is thus seen that diodes 158 and 162 collectively operate to deactivate diode 160, in the absence of a fault $R_f$, so that diode 160 cannot shut off FET switch 130 to prevent current flow through circuit 100. Moreover, the amount of current flowing through circuit 100, during the course of normal operation to charge and power device 110, can be significantly greater than the current threshold level at which diode 160 acts to shut off FET switch 130, in the presence of a fault $R_f$ as described above.

Figure 3:
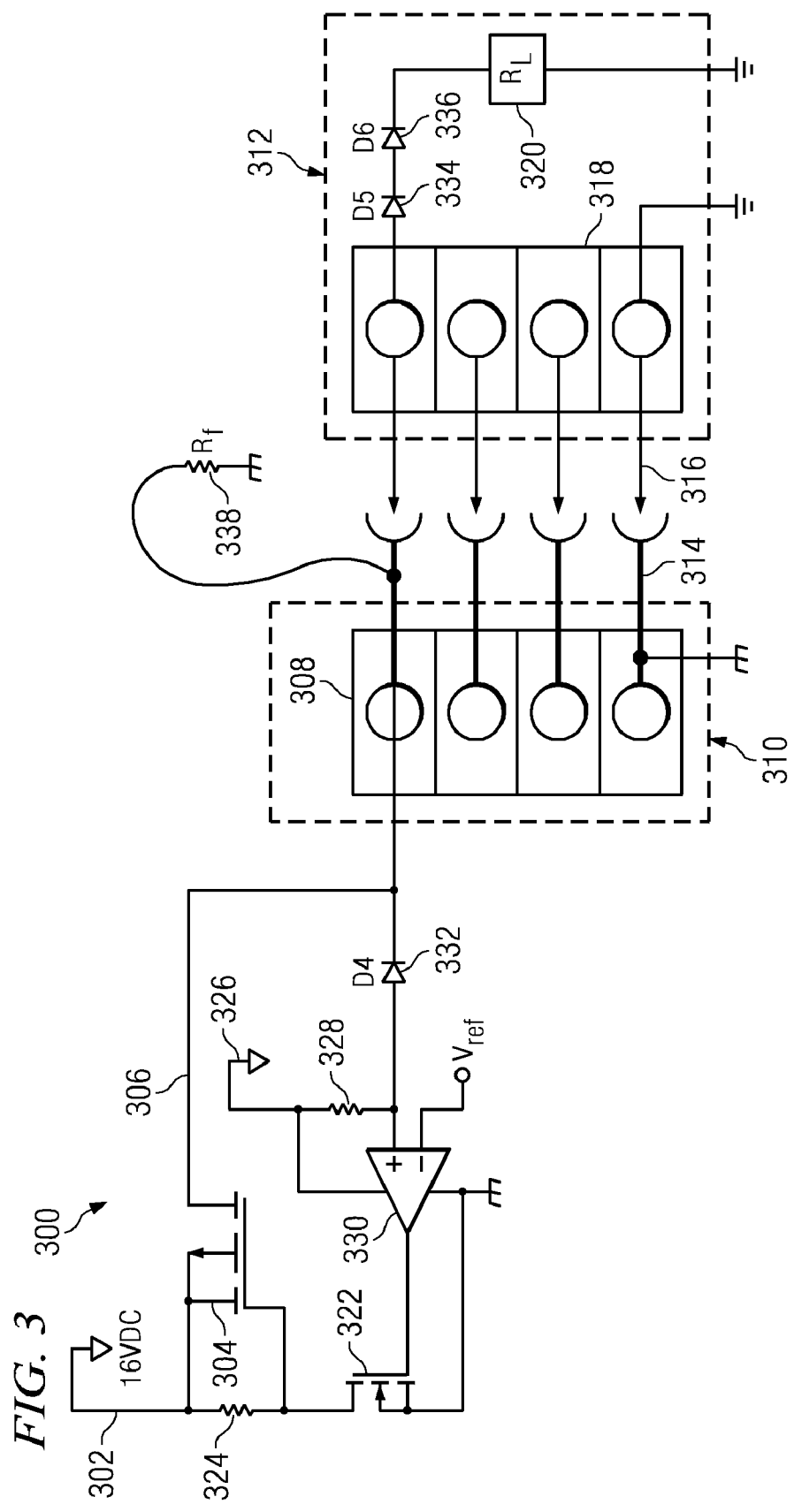
FIG. 3 is a circuit diagram showing a further embodiment of the invention, with the fault present.

Referring to FIG. 3, there is shown a circuit 300, comprising a more generic representation of an embodiment of the invention. FIG. 3 shows a 16-volt DC power supply 302 connected to furnish power to a docking connector 308, through a current path that includes a large power FET switch 304 and a conductive lead 306. Docking connector 308 is a component of a docking or charging station 310, which is configured to removably receive mobile electronic devices such as device 312, in order to provide power thereto. Connector 308 can also be the power connector attachable to an electronic device. FIG. 3 shows connector elements 314 of docking connector 308 adapted to mate with corresponding complementary connector elements 316 of device connector 318. FIG. 3 further shows a load 320 representing the resistive load $R_L$ that device 312 places on docking station 310, when device 312 is connected thereto to receive power.

Referring further to FIG. 3, there is shown a resistor 338, also referenced as $R_f$, representing a fault that shorts the current path to ground, at a point on docking connector elements 314. To limit excessive current resulting from the fault $R_f$, a control FET 322 and a pull up resistor 324 are connected to the gate of power FET switch 304, as shown in FIG. 3, to control the operation thereof.

To further control the operation of power FET 304, and thereby regulate current flow from power supply 302, FIG. 3 shows a comparator 330. The inverted input of comparator 330 is connected to a reference voltage $V_{ref}$, and the non-inverted input is connected to a DC voltage source 326, through a resistor 328. Reference voltage $V_{ref}$ can be derived from power supply 302. DC voltage source 326 can be derived from power supply 302 and can be any commonly used DC voltage level such as 3.3 VDC or 5 VDC. FIG. 3 also shows a diode 332 (D4) connected between the non-inverted input of comparator 330 and current lead 306.

The values of $V_{ref}$ and resistor 328 are respectively selected so that during normal operation of circuit 300, and in the absence of fault $R_f$, diode 332 will be reverse biased, and the voltage applied to the non-inverted input of the comparator will exceed voltage $V_{ref}$ applied to the inverted input of the comparator. In this situation, the output of comparator 330, which is connected to the gate of control FET 332, is positive. Accordingly, control FET 332 is maintained in an on mode, and acts to similarly maintain power FET switch 304 in an on mode. Current is thus allowed to flow through switch 304 and current lead 306 to docking connector 308.

On the other hand, when a fault $R_f$ occurs as shown in FIG. 3, to effectively connect the current path to ground, excessive current is pulled from the output of power supply 302. The fault also results in very low voltage, so that diode 332 becomes forward biased, and the voltage applied to the non-inverted input of comparator 330 becomes less than $V_{ref}$. The output of comparator 330 will therefore go negative and turn off control FET switch 332. When FET switch 332 is turned off, pull up resistor 324 will pull up the voltage on the gate of power FET switch 304, thereby turning off FET 304. Voltage will then be removed from lead 306.

FIG. 3 further shows diodes 334 (D5) and 336 (D6) included in device 312, and connected in series to the device load 320. Diodes 334 and 336 function in like manner as diodes 158 and 162, described above in connection with FIG. 2, to ensure that diode 332 is reverse biased in the absence of a fault 338.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a circuit for providing a current path from a power supply to a connector for a detachably connectible electronic device, apparatus for controllably limiting the current delivered to said connector, wherein said apparatus comprises:
   a first switch device located along said current path to regulate current flow therethrough;
   a current limiting entity adapted to operate said first switch device to prevent current flow through said path in response to the conditions that a pre-specified fault is affecting said circuit, and the current flowing through said path exceeds a pre-specified threshold level;
   a mechanism for deactivating said current limiting entity when current is flowing through said path to said electronic device, and said fault is absent from said path.

2. The apparatus of claim 1, wherein:
   said current limiting entity is adapted to establish said pre-specified threshold level at a current level that is less than an allowable value for current flowing through said path, when said circuit is not affected by said pre-specified fault.

3. The apparatus of claim 1, wherein:
   said pre-specified fault occurs when structure for connecting said electronic device to said charging station becomes connected to ground, and said current limiting entity comprises a first diode that is forward biased by said pre-specified fault.

4. The apparatus of claim 1, wherein:
   said pre-specified fault occurs when one of multiple structures for connecting said electronic device to a charging station becomes connected to another of said structures, and said current limiting entity comprises a first diode that is forward biased by said pre-specified fault.

5. The apparatus of claim 4, wherein:
said current limiting entity further comprises a second switch device connected to open said first switch device in response to forward biasing of said first diode, to thereby prevent current flow through said path.

6. The apparatus of claim 1, wherein:
the mechanism for deactivating the current limiting entity comprises a mechanism for reverse biasing said first diode in the absence of said pre-specified fault.

7. The apparatus of claim 6, wherein:
said reverse biasing mechanism comprises one or more second diodes connected in series with a load associated with said electronic device.

8. The apparatus of claim 4, wherein:
said first device comprises a power transistor switch, and said second switch device comprises a control transistor switch.

9. The apparatus of claim 1, wherein:
said electronic device comprises a mobile device that is detachably connectible to a charging station, and said power supply comprises a DC power supply for providing power to recharge a battery contained in said mobile device and to operate said mobile device.

10. The apparatus of claim 1, wherein:
said electronic device comprises one of a plurality of mobile devices that are each detachably connectible to a charging station to receive power therefrom.

11. A circuit for supplying power from a power supply to an electronic device, said circuit comprising:
one or more circuit elements for establishing a path for current flow from said power supply to said charging station and mobile device;
a power switch for selectively allowing and preventing current flow through said path;
a current limiting entity comprising one or more circuit components for operating said power switch to prevent current flow through said path, in response to a fault in said circuit that comprises an unintended connection between said current path and an electrical ground; and
a mechanism for deactivating said current limiting entity when current is flowing through said path to said electronic device, and said fault is absent from said path.

12. The circuit of claim 11, wherein:
said current limiting entity operates said power switch in response to said fault when the current flowing through said path exceeds a threshold level that is selectively less than an allowable value for current flowing through said path to charge said electronic device, and said fault is absent from said path.

13. The circuit of claim 11, wherein:
said current limiting entity comprises a first diode that is forward biased by said fault, and a control switch connected to operate said power switch to prevent current flow along said path, in response to forward biasing of said first diode.

14. The circuit of claim 13, wherein:
said power switch and said control switch respectively comprise FETs.

15. The circuit of claim 11, wherein:
said deactivating mechanism comprises one or more second diodes located within said electronic device, and connected in series with a load of said device.

16. In a circuit for supplying power from a power supply to an electronic device, a method comprising the steps of:
establishing a path for current flow from said power supply to said electronic device;
providing a power switch to selectively allow and prevent current flow through said path;
operating a current limiting entity to cause said power switch to prevent current flow through said path, in response to a fault in said circuit that comprises an unintended connection between said current path and an electrical ground; and
deactivating said current limiting entity when current is flowing through said path to said electronic device, and said fault is absent from said circuit.

17. The method of claim 16, wherein:
said current limiting entity operates said power switch in response to said fault when the current flowing through said path exceeds a threshold level that is selectively less than an allowable value for current flowing through said path to charge said electronic device, and said fault is absent from said path.

18. The method of claim 16, wherein:
said current limiting entity comprises a first diode and a control switch that cooperatively operate said power switch to prevent current flow along said path, in response to forward biasing of said first diode.

19. The method of claim 13, wherein:
said power switch comprises a large power FET.

20. The method of claim 16, wherein:
said deactivating step is current out by one or more second diodes located within said electronic device and connected in series with a load of said device.

* * * * *